United States Patent Office 3,418,808
Patented Dec. 31, 1968

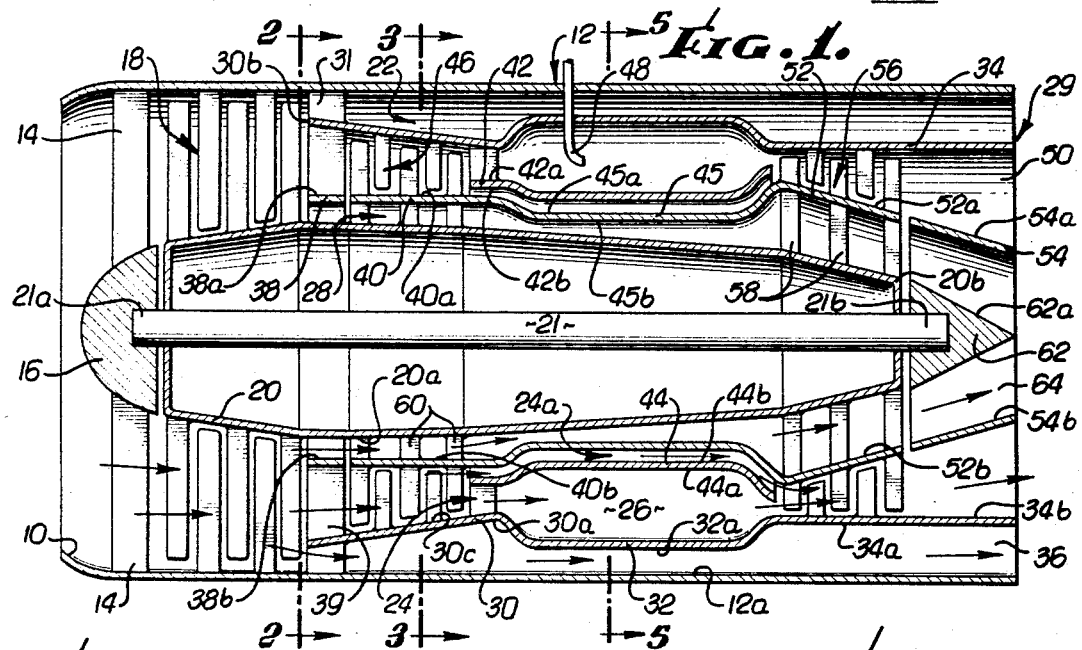

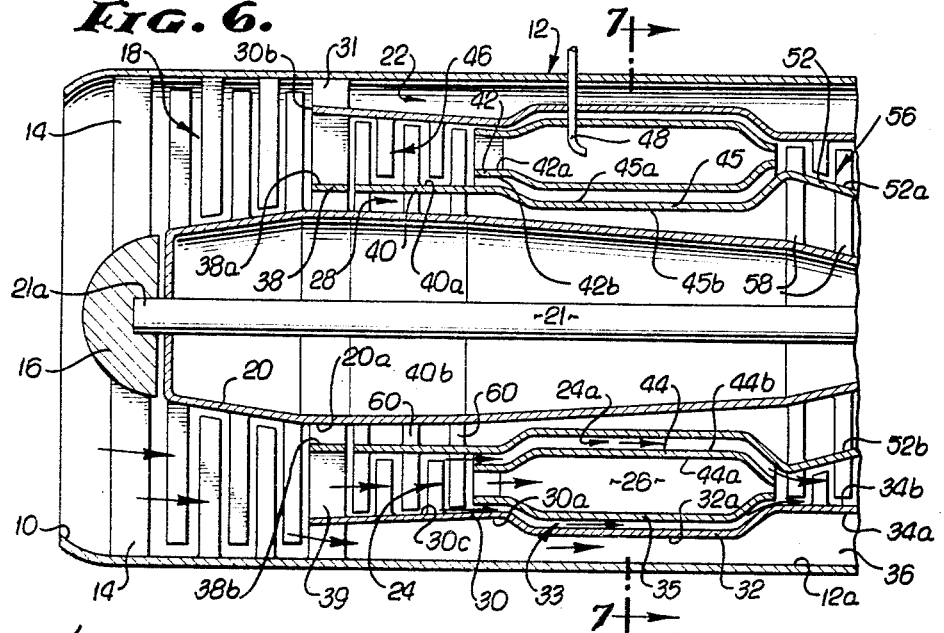
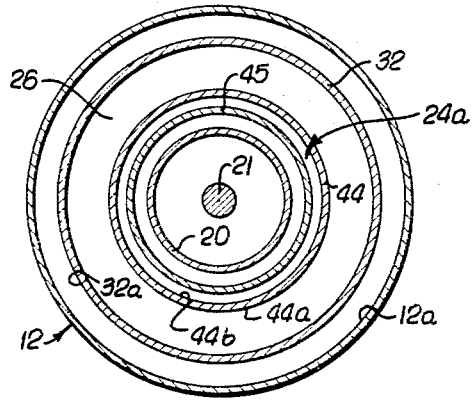
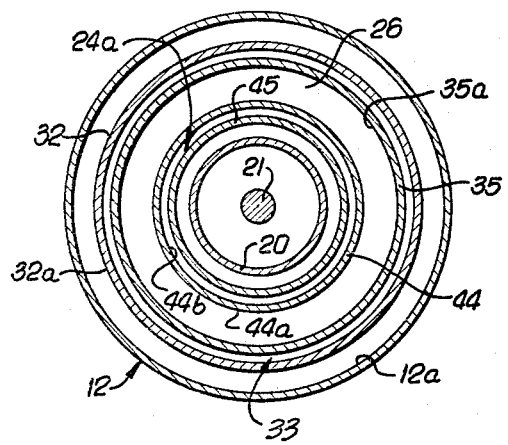
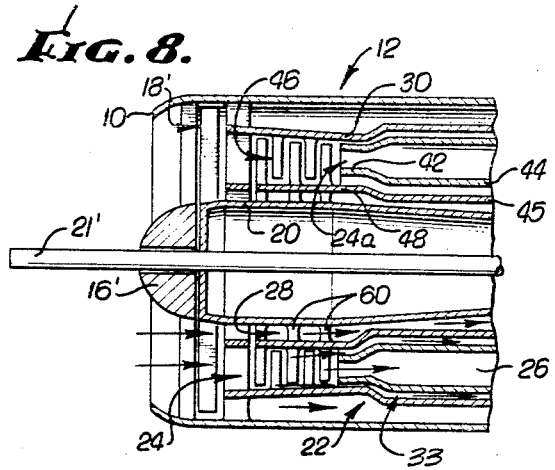
INVENTOR.
DAVID RICH
By Huebner & Worrel
ATTORNEYS.

3,418,808
GAS TURBINE ENGINES
David Rich, 3741 E. Pasadena Ave.,
Phoenix, Ariz. 85018
Continuation-in-part of application Ser. No. 562,806,
July 5, 1966. This application Jan. 3, 1967, Ser. No.
606,777
6 Claims. (Cl. 60—226)

ABSTRACT OF THE DISCLOSURE

This improvement in gas turbine engines incorporates special internal cooling ducts which provide air passageways adjacent to the internal components of the engine. These cooling ducts are concentric with the combustion duct of a gas turbine engine and function as by-pass pasageways which provide a large stream of cooling air inside the engine and through the turbine.

---

This application is a continuation-in-part of my copending U.S. patent application, Ser. No. 562,806, filed July 5, 1966.

In gas turbine engines an important limitation to the power which can be produced and the efficiency of the engine is the amount of heat the internal components such as the turbine wheels, turbine blades, fixed vanes and engine bearings can withstand before they will fail. Various techniques have been used to alleviate the heat problem of the internal engine components. These techniques include using materials which can withstand higher temperatures, high temperature lubricants, hollow air cooled turbine blades and bleeding cooling air from various stages of the compressor to cool the hot inner parts of the engine. However, limitations to the performance of gas turbine engines due to interior engine heat still exist despite these techniques, which often are inefficient and wasteful of energy that otherwise could be developed by the engine.

Hence, it is a primary object of this invention to provide a novel structure for cooling the internal components of a gas turbine engine which is superior to prior techniques.

It is a further object of this invention to provide a cooling structure for gas turbine engines which is efficient and does not waste the potential energy of the engine.

A still further object of this invention is to provide a by-pass type air diversion cooling structure in a turbine engine which is especially effective in cooling the internal engine components.

Other objects and advantages will be apparent from the following description and drawings wherein:

FIGURE 1 is a simplified longitudinally sectioned schematic view of a single spool by-pass type gas turbine engine incorporating the unique internal by-pass cooling system which is the subject of this invention;

FIGURE 2 is a cross-sectional view taken along the line 2—2 in FIGURE 1 showing the diversion of the inlet air into the engine;

FIGURE 3 is a cross-sectional view taken along the line 3—3 in FIGURE 1 showing the air passages through and around the high pressure stages of the axial compresor;

FIGURE 4 is a fragmented schematic view of the forward portion of a turboshaft type gas turbine engine embodying an internal by-pass cooling pasageway in accordance with this invention;

FIGURE 5 is a cross-sectional view taken along the line 5—5 in FIGURE 1;

FIGURE 6 is a longitudinally sectioned schematic view of a modified form of the gas turbine engine;

FIGURE 7 is a cross-sectional view taken along the line 7—7 in FIGURE 6; and

FIGURE 8 is a fragmented schematic view of the board portion of a turboshaft type gas turbine engine embodying the modified form of this invention as in FIGURES 6 and 7.

Though applicable to all other types of gas turbine engines reference will be made herein primarily to aircraft by-pass type gas turbine engines as schematically illustrated in the form modified in accordance with this invention in FIGURES 1, 2, 3 and 5, the conventional parts of which will be described only briefly. In this type of engine when in operation air enters through a circular front inlet 10 in the forward end of a hollow cylindrical external engine casing 12 that surrounds the engine components. The air then passes through a plurality of static guide vanes 14 which are secured at their inner ends to and radiate from a rounded centrally positioned nose cap 16 and which are secured at their outer ends to the inside of engine casing 12 just to the rear of its inlet 10.

After passing through the static guide vanes 14 and concentrically around nose cap 16 the air then passes through a low pressure axial compressor 18 consisting of one or more stages concentrically disposed around and radiating from the forward part of a rotatably mounted elongated cylindrical drive shaft housing 20 axially extending within casing 12 and within which is axially mounted an elongated circular cylindrical drive shaft 21. Thereafter, the air is diverted through three major concentric passageways the outermost of which is the external by-pass duct 22, the intermediate one being a combustion duct 24 leading through a high pressure compressor to the radially positioned combustion chambers 26, and interior of combustion duct 24, an internal bypass duct 28. Additionally, a small relative portion of the air passing through the intermediate combustion duct 24 is diverted so as to by-pass internally around the combustion chambers 26 through a concentric turbine cooling by-pass passageway 24a. The internal components of the engines to be briefly referred to when relevant to this invention are supported within the external engine casing in a conventional manner. The rotating parts are mounted on suitable bearings lubricated by conventional systems.

The outside periphery of the external by-pass duct 22 is defined by the cylindrical inner wall 12a of the external engine casing 12 from the rear of the low pressure compressor 18 to the rear outlet 29 of the engine. Its inner boundary is defined by the outside surface 30a of a concentric annular outer combustion duct casing 30 secured to the inner wall 12a of casing 12 by radiating support arms 31 and extending from its annular inlet lip 30b disposed at the rear of low pressure compressor 18 to the front of the exterior combustion chamber wall 32, the outer surface 32a of the exterior combustion chamber wall 32 and the outer surface 34a of an annular outer exhaust casing 34 extending from the rear of the exterior combustion chamber wall 32 to the rear outlet 29 of the engine. Thus, air diverted through the external by-pass duct 22 is discharged from the engine through the concentric external by-pass exhaust 36 in the rear outlet 29 of the engine, picking up heat energy and consequent velocity on the way so as to augment the thrust of the engine.

The exterior of the combustion duct 24 is defined by the inside surface 30c of the annular outer combustion duct casing 30. The interior of the combustion duct 24 is defined from front to rear by the outer surface 38a of a concentric annular inner combustion casing 38 supported by the radiating arms 39 connected to outer combustion duct casing 30, the outer surface 40a of an annular compressor wall 40 and the inside surface 42a of the combustion chamber lip 42 of an interior combustion chamber wall 44, the latter which, together with the external combustion chamber walls 32 form combustion chambers 26. Air passing through this combustion duct 24 is compressed further by a high pressure compressor 46, the blades of which are in duct 24, before it enters the combustion chambers 26 into which fuel is normally sprayed by a fuel injector 48 from a pressurized source (not shown). Upon ignition of the fuel-air mixture in a conventional manner the gases are discharged from combustion chambers 26 so as to provide thrust from the engine through a combustion exhaust passageway 50, the exterior of which is defined by the interior surface 34b of the annular exhaust casing 34. The interior of exhaust passageway 50 is defined, from front to rear, by the exterior surface 52a of an annular turbine casing 52 and the exterior surface 54a of an annular truncated tail cone 54. As these gases pass through exhaust passageway 50 they rotate the turbine 56 the blades of which are disposed in passageway 50 and which is connected by radially extending turbine arms 58 to drive shaft housing 20. This, in turn, rotates the low pressure compressor 18 and the high pressure compressor 46, the latter being connected to the common drive shaft housing 20 by radiating compressor arms 60.

The description of the illustrated aircraft gas turbine engine has been conventional to this point save for the addition of passageway 24a and duct 28 and is only intended as an orientation to the improvement thereto hereinafter described. That is, a unique improvement in gas turbine engines in accordance with my invention is to provide such an engine with an internal by-pass duct 28 which not only provides the advantages in propulsion of the normal by-pass type jet engine, but cools the internal components of the engine so that it may operate even more efficiently. A further improvement herein is the turbine cooling by-pass passageway 24a which opens concentrically from the combustion duct 24 at the rear of high pressure compressor 46 and by-passes the combustion chambers 26 so as to direct a blast of cooling air onto the base of the blades of the turbine 56 immediately to the rear of the combustion chambers 26. Thus, the cooling effect of this diverted airflow allows the turbine and interior engine components to operate at a higher combustion temperature with consequent greater efficiency. Also the air traveling through the by-pass system not only will significantly cool the engine interior but is not wasted as is bled air, since the heat that it absorbs will increase its exhaust velocity thereby augmenting the thrust of the engine.

The interior of this internal by-pass duct 28 is defined by the exterior surface 20a of the drive shaft housing 20 from just to the rear of the low pressure compressor 18 to the rear end 20b of the housing 20. From there to the rear outlet 29 of the engine the interior of the internal by-pass duct 28 is defined by the exterior surface 62a of a cone-shaped exhaust bullet 62 centrally mounted adjacent the outlet 29 within casing 12 and within which the rear end 21b of the axial shaft 21 is journaled for rotatable movement the front end 21a being rotatably journaled in nose cap 16. The outer periphery of the internal by-pass duct 28 is defined, from front to rear, by the inner surface 38b of the annular inner combustion casing 38, and then the continuous inner surface 40b of the compressor casing 40, the inner surface 45b of a combustion chamber by-pass wall 45, the inner surface 52b of the annular turbine casing 52, and the inner surface 54b of the annular truncated tail cone 54. Hence, air diverted through the internal by-pass duct 28 will be discharged from the engine through a concentric internal by-pass exhaust 64 surrounding bullet 62 and will pass a large mass of cooling air close to the bulk of the internal components of the engine in a substantially uninterrupted concentric axial flow therethrough. The massive cooling effect produced thereby not only allows increased temperature in the combustion chamber but permits the more practical inclusion of various heat sensitive accessories within the engine which ordinarily would have to be mounted outside the engine. Also, since the engine exhaust is sandwiched between two by-pass passageways its noise will be acoustically muffled to a great extent.

It can be seen that the air diverted into internal by-pass duct 28 performs its cooling function in a distinctly different manner from merely bleeding air into the engine interior as was done prior to this invention. For instance, whereas air bled into the engine interior generally reduces the engine efficiency since it, in effect, is wasted so far as any direct thrust is produced thereby, air which flows axially in by-pass duct 28 adds to the thrust of the engine in accordance with normal by-pass principles. The ratio of air by-passed to that used for combustion varies according to performance requirements which control the specific size and shape of each of the air passageways.

The relatively small concentric turbine cooling by-pass passageway 24a is defined externally by an internal surface 42b of the lip 42 and an internal surface 44b of the interior combustion chamber wall 44. Internally the turbine cooling by-pass passageway 24a is defined by the external surface 45a of the combustion chamber by-pass wall 45 which extends continuously between compressor casing 40 and turbine case 52. By-pass wall 45 is spaced slightly inwardly from combustion chamber wall 44 so that the entry into cooling by-pass passageway 24a from combustion duct 24 is adjacent to forward lip 42 and the exit therefrom is adjacent to the rear of combustion chambers 26 and the forward portion of the blades of turbine 56. Thus, without any leakage the entire amount of air compressed by the compressor 46 is discharged through the turbine 56. That is, a major portion travels through the combustion chambers 26 to provide thrust for the engine and a minor portion is diverted around the combustion chambers 26 through by-pass passageway 24a to cool the first stage turbine blades and reduce the blade temperatures to a safe level.

The internal by-pass cooling system in accordance with my invention can be used with turboshaft type gas turbine engines as shown in FIGURE 4. In this schematic drawing the rear portion of the engine is essentially the same as described relative to FIGURE 1 and so is not shown nor its description reiterated here. In the fragmented front portion of the engine shown the same numerals are used to designate like parts and primed numerals used to designate modified parts.

Thus, the turboshaft aircraft engine in FIGURE 4 has a cylindrical external engine casing 12 with a circular forward inlet lip 10. Concentrically disposed within engine casing 12 are an external by-pass duct 22, a combustion duct 24, a turbine cooling by-pass passageway 24a and an internal by-pass duct 28 surrounding a cylindrical drive shaft housing 20. Axially mounted within the drive shaft housing 20 is a drive shaft 21' which is journaled for rotatable movement and passes forward through nose cap 16'. In turn, to its forward end may be attached a propeller or other power take-off device (not shown) by suitable modifications.

As the previously described form of this invention air will enter the engine through inlet 10, pass through radial guide vanes 14 and through a low pressure compressor 18' shown as a single stage fan type here. Thereafter, the air will be diverted through each of the three ducts 22, 24, 28 and by-pass passageway 24a and eventually be discharged as previously described. The passageway through duct 28 allows a large mass of air at low pressure to flow therethrough adjacent to the internal components of the engine thereby producing a massive cooling effect with a minimum of power loss. And, as in the previously described embodiment of this invention, a relatively small amount of air from the high pressure compressor 46 is diverted around the combustion chambers 26 to direct a blast of cooling air into the turbine blades disposed rearwardly of the combustion chambers 26.

The modified form of this invention shown in FIGURES 6 and 7 is similar to that previously disclosed, with like numbers designating like parts, save that it incorporates additionally a small concentric exterior combustion chamber by-pass passageway 33 which receives compressed air from the high pressure compressor 46 and diverts a cooling blast of air around the outside of the combustion chambers 26 onto the tips of the blades of turbine 56 immediately to the rear thereof. Thus, the cooling effect of the engine is further increased by this passageway 33 without loss of efficiency since this by-passed air is still diverted essentially in an axial flow and precisely onto the parts of the turbine 56 where it will do the most good.

An annular interior combustion chamber wall 35 spaced inwardly from the exterior combustion chamber wall 32 within combustion chambers 26 forms the interior of passageway 33 with its outer surface 35a. The exterior of passageway 33 is defined by the inner surface 32b of the exterior combustion chamber wall 32.

The efficiency of a turboshaft type gas turbine engine is also increased by the addition of an exterior combustion chamber by-pass passageway 33 constructed in a manner substantially the same as previously described. Such a passageway 33 is shown in FIGURE 8 with like parts being designated by like numerals.

The amount of air that bypassses the combustion chamber and is applied to cool the turbine blades could be controlled so that when maximum power is required and the maximum blade cooling is essential, the amount of air bypassing the combustion chamber is at a maximum. However, when the engine power is reduced, this volume of bypassed air could be reduced or cut off completely, and the air could be reduced or cut off completely, and the cooling effect of the internal air stream would be adequate to keep the turbine running at a safe temperature.

The foregoing description of this invention has been illustrated in connection with aircraft bypass gas turbines as preferred embodiments. However, the advantages described can also be attained with engines using centrifugal and mixed axial and centrifugal compressors. Also, the invention can be used in stationary engines where the exhaust thrust is not used for propulsion and the maximum shaft power is needed. When used for these purposes modifications in the structure would normally include elimination of the external duct 22 and reduction of the relative size of the internal by-pass duct 28 to that required for cooling only. Also, though the engine illustrated is of the single spool type the invention can be used with multiple spool engines.

Although I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent structures and devices.

I claim:

1. In a gas turbine engine comprising: a hollow cylindrical external engine casing embodying an intake opening in its front end and an exhaust opening in its rear end; an axially positioned nose cap mounted within said engine casing adjacent to said intake opening therein; guide vanes radiating from said nose cap as a support therefor, said guide vanes being secured to the inner surface of said engine casing; a tail cone bullet axially positioned within said engine casing supported therein adjacent to said exhaust opening in the rear of said casing; an elongated drive shaft axially extending within said external engine casing, the front end of which is rotatably supported by said nose cap and the rear end of which is rotatably supported by said tail cone bullet; a cylindrical drive shaft housing concentrically supported by said drive shaft and substantially encompassing said drive shaft between said nose cap and said tail cone bullet; a low pressure axial compressor radiating from said drive shaft housing immediately to the rear of said guide vanes; a high pressure axial compressor within said engine casing immediately to the rear of said low pressure axial compressor connected by radiating compressor arms to said drive shaft housing; at least one radially positioned combustion chamber supported by and within said engine casing immediately to the rear of said high pressure compressor; means for injecting fuel into said combustion chamber; an axially rotatable turbine immediately to the rear of said combustion chamber within said engine casing connected to said drive shaft housing by radiating turbine arms, the combination with: a concentric combustion duct defining a passageway whereby air is diverted from the rear of said low pressure compressor through said high pressure compressor into said combustion chamber; a concentric combustion exhaust duct to the rear of said combustion chamber defining a passageway from the rear of said combustion chamber through said turbine to the exhaust opening in said engine casing; a concentric external non-bifurcated by-pass duct defining a passageway within said engine casing from the rear of said low pressure compressor exterior of the high pressure compressor, the combustion chamber, the turbine and exhausting exterior of said combustion exhaust; and a concentric internal non-bifurcated by-pass duct defining a passageway within said engine casing from the rear of said low pressure compressor, interior of the high pressure compressor, the combustion chambers, the turbine and exhausting interior of said combustion exhaust, said internal by-pass duct surrounding said drive shaft housing so that air flowing therethrough will cool the hot internal engine components.

2. A gas turbine engine as defined in claim 1 which includes a concentric turbine cooling by-pass passageway having an inlet opening from the rear of said high pressure compressor adjacent to the entry into the combustion chamber, an air flow conduit passing around said combustion chamber and an outlet opening into a combustion exhaust duct to the rear of said combustion chamber thereby diverting a relatively small portion of compressed cool air onto the turbine.

3. A gas turbine engine as defined in claim 1 which includes a pair of concentric passageways which both open from said high pressure compressor to divert air generally axially around the combustion chamber, one of said passageways being formed within the engine internally of said combustion chamber and providing an air exit adjacent the base of the turbine blades to the rear thereof and the other of said passageways being formed within the engine externally of said combustion chamber and providing an air exit adjacent the tips of said turbine blades.

4. A gas turbine engine comprising: a hollow cylindrical external engine casing embodying an intake opening in its front end and an exhaust opening in its rear end; an axially extending drive shaft housing rotatably mounted within said external engine casing; an axial compressor including a forward low pressure portion and a rear high pressure portion radiating from said drive shaft housing to the rear of said intake opening in said engine casing; a turbine radiating from said drive shaft housing forward of said exhaust opening in the rear of said engine casing; a combustion chamber supported in said engine casing spaced from said drive shaft housing and positioned between said axial compressor and said turbine; a combustion passageway within said engine casing extending from the rear of the high pressure portion of said compressor into said combustion chamber and exhausts from said chamber through said turbine to said exhaust opening of said casing; and a concentric axial, non-bifurcated internal by-pass duct surrounding said drive shaft housing and extending from the rear of the low-pressure portion of said compressor to said exhaust opening of said casing and by-passing said high pressure portion of said compressor, said internal by-pass duct defining a space between said combustion passageway and said drive shaft housing, said internal bypass duct providing a substantially uninterrupted concentric axial conduit about said drive shaft housing for the flow of air through said engine whereby in use a large quantity of air passing said low pressure portion of said compressor is axially urged through the by-pass conduit, and will cool the internal components of said engine.

5. A gas turbine engine as defined in claim 4 which includes a concentric turbine cooling by-pass passageway which opens from the rear of the high pressure portion of the compressor adjacent to the inlet of the combustion chamber and defines a continuous air duct exterior of said combustion chamber with an outlet opening into the turbine, said by-pass passageway being relatively small compared to the combustion chamber thereby diverting a small amount of compressed, relatively cool air onto said turbine.

6. A gas turbine engine as defined in claim 4 which includes a pair of concentric passageways which both open from and are in direct line with said high pressure compressor to divert air generally axially around the combustion chamber, one of said passageways being formed within the engine internally of said combustion chamber and providing an air exit adjacent the base of the turbine blades to the rear thereof and the other of said passageways being formed within the engine externally of said combustion chamber and providing an air exit adjacent the tips of said turbine blades.

References Cited

UNITED STATES PATENTS

| 2,409,176 | 10/1946 | Allen | 60—262 |
| 2,930,190 | 3/1960 | Rogers | 60—226 |
| 2,933,886 | 4/1960 | Sharma | 60—262 |

FOREIGN PATENTS 1,297,052   5/1962   France.

JULIUS E. WEST, *Primary Examiner.*

DOUGLAS HART, *Assistant Examiner.*

U.S. Cl. X.R.

60—39.66